(12) United States Patent
Shibata et al.

(10) Patent No.: US 9,525,305 B2
(45) Date of Patent: Dec. 20, 2016

(54) ELECTRIC SYSTEM AND VEHICLE

(71) Applicant: Sharp Kabushiki Kaisha, Osaka-shi, Osaka (JP)

(72) Inventors: Akihide Shibata, Osaka (JP); Kenji Komiya, Osaka (JP); Kohtaroh Kataoka, Osaka (JP); Hiroshi Iwata, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 64 days.

(21) Appl. No.: 14/408,631

(22) PCT Filed: Jul. 22, 2013

(86) PCT No.: PCT/JP2013/069821
§ 371 (c)(1),
(2) Date: Dec. 17, 2014

(87) PCT Pub. No.: WO2014/030478
PCT Pub. Date: Feb. 27, 2014

(65) Prior Publication Data
US 2015/0303739 A1 Oct. 22, 2015

(30) Foreign Application Priority Data

Aug. 22, 2012 (JP) .................................. 2012-183636
Aug. 22, 2012 (JP) .................................. 2012-183637

(51) Int. Cl.
*H02J 7/35* (2006.01)
*H02J 7/34* (2006.01)
*B60R 16/03* (2006.01)
*B60R 16/033* (2006.01)
*F02N 11/08* (2006.01)

(52) U.S. Cl.
CPC ................. *H02J 7/35* (2013.01); *B60R 16/03* (2013.01); *B60R 16/033* (2013.01);
(Continued)

(58) Field of Classification Search
CPC .................................. H02J 7/35; B60R 16/03
(Continued)

(56) References Cited

U.S. PATENT DOCUMENTS 5,488,283 A * 1/1996 Dougherty .......... B60L 11/1855
307/10.1
5,722,502 A * 3/1998 Kubo ..................... B60K 6/442
180/65.23

(Continued)

FOREIGN PATENT DOCUMENTS

JP S61-88724 A 5/1986
JP S61-161484 A 7/1986
(Continued)

OTHER PUBLICATIONS

International Search Report PCT/ISA/210 for International Application No. PCT/JP2013/069821 dated Aug. 1, 2013.
(Continued)

*Primary Examiner* — Tulsidas C Patel
*Assistant Examiner* — Sean Gugger
(74) *Attorney, Agent, or Firm* — Harness, Dickey & Pierce, P.L.C.

(57) ABSTRACT

An in-vehicle solar system that supplies electric energy from a solar battery module to an electric device such as a secondary battery, a load, and the like includes a capacitor that accumulates electric energy from the solar battery module and supplies the accumulated electric energy to the electric device.

5 Claims, 10 Drawing Sheets

(52) U.S. Cl.
CPC .......... *F02N 11/0866* (2013.01); *H02J 7/345* (2013.01); *F02N 11/0814* (2013.01); *F02N 2011/0885* (2013.01); *F02N 2011/0888* (2013.01)

(58) Field of Classification Search
USPC ..................................................... 290/38 C
See application file for complete search history.

(56) References Cited

U.S. PATENT DOCUMENTS

| | | | |
|---|---|---|---|
| 6,371,067 B1 * | 4/2002 | Schmitz | F02N 11/0866 123/179.28 |
| 2005/0252546 A1 | 11/2005 | Sasaki | |
| 2009/0289594 A1 * | 11/2009 | Sato | G05F 1/67 320/101 |
| 2010/0213887 A1 * | 8/2010 | Louch | H02J 7/35 320/101 |
| 2010/0313930 A1 * | 12/2010 | Yokobayashi | H04M 19/08 136/244 |
| 2011/0133677 A1 * | 6/2011 | Franke | B60L 11/1887 318/400.3 |
| 2012/0073885 A1 * | 3/2012 | Glynn | B60K 16/00 180/2.2 |
| 2012/0112684 A1 * | 5/2012 | Xu | B60L 3/0046 320/101 |
| 2015/0270731 A1 * | 9/2015 | Adelmann | H02J 7/35 320/101 |
| 2015/0349582 A1 * | 12/2015 | Maeno | B60L 3/0046 320/101 |

FOREIGN PATENT DOCUMENTS

| | | |
|---|---|---|
| JP | 06-98477 A | 4/1994 |
| JP | H0759271 A | 3/1995 |
| JP | 11-069658 A | 3/1999 |
| JP | 2000-278883 A | 10/2000 |
| JP | 2002-31671 A | 1/2002 |
| JP | 2003-143713 A | 5/2003 |
| JP | 3529660 B2 | 5/2004 |
| JP | 2005-045886 A | 2/2005 |
| JP | 2005-328662 A | 11/2005 |
| JP | 2007-135355 A | 5/2007 |
| JP | 2009-148064 A | 7/2009 |
| JP | 2010-287795 A | 12/2010 |
| JP | 2011-010418 A | 1/2011 |
| JP | 2011-249598 A | 12/2011 |

OTHER PUBLICATIONS

Written Opinion of the International Searching Authority PCT/ISA/237 for International Application No. PCT/JP2013/069821 dated Aug. 1, 2013.

Office Action for Corresponding Japanese Application No. 2012-183636 issued on Sep. 27, 2016.

Office Action for Corresponding Japanese Application No. 2012-183637 issued on Sep. 27, 2016 and English language translation thereof.

* cited by examiner

FIG. 10

|   | 1 | 1 | 1 | 1 | 1 | 1 | 1 |
|---|---|---|---|---|---|---|---|
| 2 | 2 | 2 | 2 | 2 | 2 | 2 | 2 |
| 3 | 3 | 3 | 3 | 3 | 3 | 3 | 3 |
| 4 | 4 | 4 | 4 | 4 | 4 | 4 | 4 |
| 5 | 5 | 5 | 5 | 5 | 5 | 5 | 5 |
| 6 | 6 | 6 | 6 | 6 | 6 | 6 | 6 |
| 7 | 7 | 7 | 7 | 7 | 7 | 7 | 7 |
| 8 | 8 | 8 | 8 | 8 | 8 | 8 | 8 |

FIG. 11

| 1 | 6 | 3 | 8 | 5 | 2 | 7 | 4 |
|---|---|---|---|---|---|---|---|
| 2 | 7 | 4 | 1 | 6 | 3 | 8 | 5 |
| 3 | 8 | 5 | 2 | 7 | 4 | 1 | 6 |
| 4 | 1 | 6 | 3 | 8 | 5 | 2 | 7 |
| 5 | 2 | 7 | 4 | 1 | 6 | 3 | 8 |
| 6 | 3 | 8 | 5 | 2 | 7 | 4 | 1 |
| 7 | 4 | 1 | 6 | 3 | 8 | 5 | 2 |
| 8 | 5 | 2 | 7 | 4 | 1 | 6 | 3 |

ELECTRIC SYSTEM AND VEHICLE

TECHNICAL FIELD

The present invention relates to a power supply device, a solar system, an electric system, and a vehicle for supplying electric energy from a solar battery to electric devices such as a secondary battery and a load.

BACKGROUND ART

In recent years, use of renewable energy such as wind and sunlight is actively discussed in view of solving problems related to energy. For example, PTL 1 discloses a vehicle power supply system that uses a solar battery module. The vehicle power supply system supplies power from the solar battery module to a load via a storage battery (secondary battery) and a control circuit. This enables reduction of degradation of fuel efficiency due to supply of power from a generator (alternator) to the load.

Incidentally, auxiliary equipment and electric components of a vehicle are usually driven by power that is accumulated in a lead storage battery. Thus, a capacity of the lead storage battery is set such that the total power consumption of the auxiliary equipment and the electric components does not exceed the power supply capability of the lead storage battery for a long time. Further, the lead storage battery is charged with power generated by the generator (alternator) that is connected with an engine while the engine operates. Thus, a power generation amount of the generator is set not to stay below the total power consumption of the auxiliary equipment and the electric components for a long time. This hinders the power amount (electricity amount) that the lead storage battery is capable of outputting from becoming very low (dead battery).

Recent vehicles in many cases employ a start-stop function that turns off the engine while the vehicle stands still for improving fuel efficiency. In this case, power for driving a starter that restarts the engine is usually supplied from the lead storage battery (for example, PTL 2).

CITATION LIST

Patent Literature

PTL 1: Japanese Unexamined Patent Application Publication No. 6-98477 (published on Apr. 8, 1994)
PTL 2: Japanese Unexamined Patent Application Publication No. 2002-31671 (published on Jan. 31, 2002)

SUMMARY OF INVENTION

Technical Problem

However, the installation area of an in-vehicle solar battery module is limited in accordance with the size of the vehicle, and output power (electric energy per unit time) is thus also limited. Further, while the power generated by the solar battery module is charged to the secondary battery, circuits related to the charge such as an in-vehicle electronic control unit (ECU) and a converter operate. Thus, a considerable portion of the power generated by the solar battery module is consumed to make the circuits operate, and a ratio of the power charged to the secondary battery to the generated power is significantly reduced.

For example, in a case where a solar battery cell area of the solar battery module is 1 m$^2$ and conversion efficiency is 20%, a rated output of the solar battery module is 200 W. On the other hand, power consumption of the circuits related to the charge reaches several ten watts.

Further, a huge current flows through quite a few pieces of auxiliary equipment and electric components in a short time. For example, a very large inrush current flows in a start in many pieces of auxiliary equipment and electric components. Further, a current of approximately 100 A flows through the starter that starts the engine in a case of a lead storage battery of 12 V. Degradation of the secondary battery such as the lead storage battery accelerates as the frequency of application of a large current (discharge) in a short time increases.

Particularly, in a case of a start-stop vehicle, the starter is frequently driven after engine stops, thus making above problems serious. This is because the generator stops when the engine stops and a large load is thus applied to the lead storage battery. The lead storage battery that takes measures against the large load in a short time to reduce the above problems is installed in the start-stop vehicle. However, such a lead storage battery is in general expensive.

Incidentally, an automobile in which the solar battery module is installed has been developed in recent years. Further, as described above, PTL 1 discloses a vehicle power supply system that uses a solar battery module. Accordingly, it may be possible that a large current is applied to the load in a short time from the solar battery module instead of the secondary battery. Realizing this may reduce the frequency of application of a large current in a short time from the secondary battery to the load and may reduce degradation of the secondary battery.

However, the installation area of the solar battery module is limited in accordance with the size of the vehicle, and the output power (electric energy per unit time) is thus also limited. Further, the power fluctuates in accordance with weather, a temperature, and the like. Accordingly, it is difficult that a large current is applied from the solar battery module in a short time. Actually, in PTL 1, the power from the storage battery is supplied to the load in the start, and the power from the solar battery module is thereafter supplied to the load. That is, in PTL 1, the solar battery module is not used for applying a large current in a short time.

The present invention has been made in consideration of the above problems, and an object thereof is to provide a configuration that enables effective supply of power generated by a solar battery to electric devices such as a secondary battery and a load.

Solution to Problem

A power supply device according to the present invention is a power supply device that supplies electric energy from a solar battery to an electric device and includes a capacitor that accumulates electric energy from the solar battery and outputs the accumulated electric energy to the electric device in order to solve the above problems.

Advantageous Effects of Invention

As described above, the power supply device according to the present invention has an effect of enabling effective supply of power generated by the solar battery to electric devices such as a secondary battery and a load.

BRIEF DESCRIPTION OF DRAWINGS

FIG. 10 is a plan view that illustrates an example of arrangement of solar battery cells in the solar battery module.

FIG. 11 is a plan view that illustrates another example of arrangement of the solar battery cells in the solar battery module.

DESCRIPTION OF EMBODIMENTS

[First Embodiment]

Figure 1:
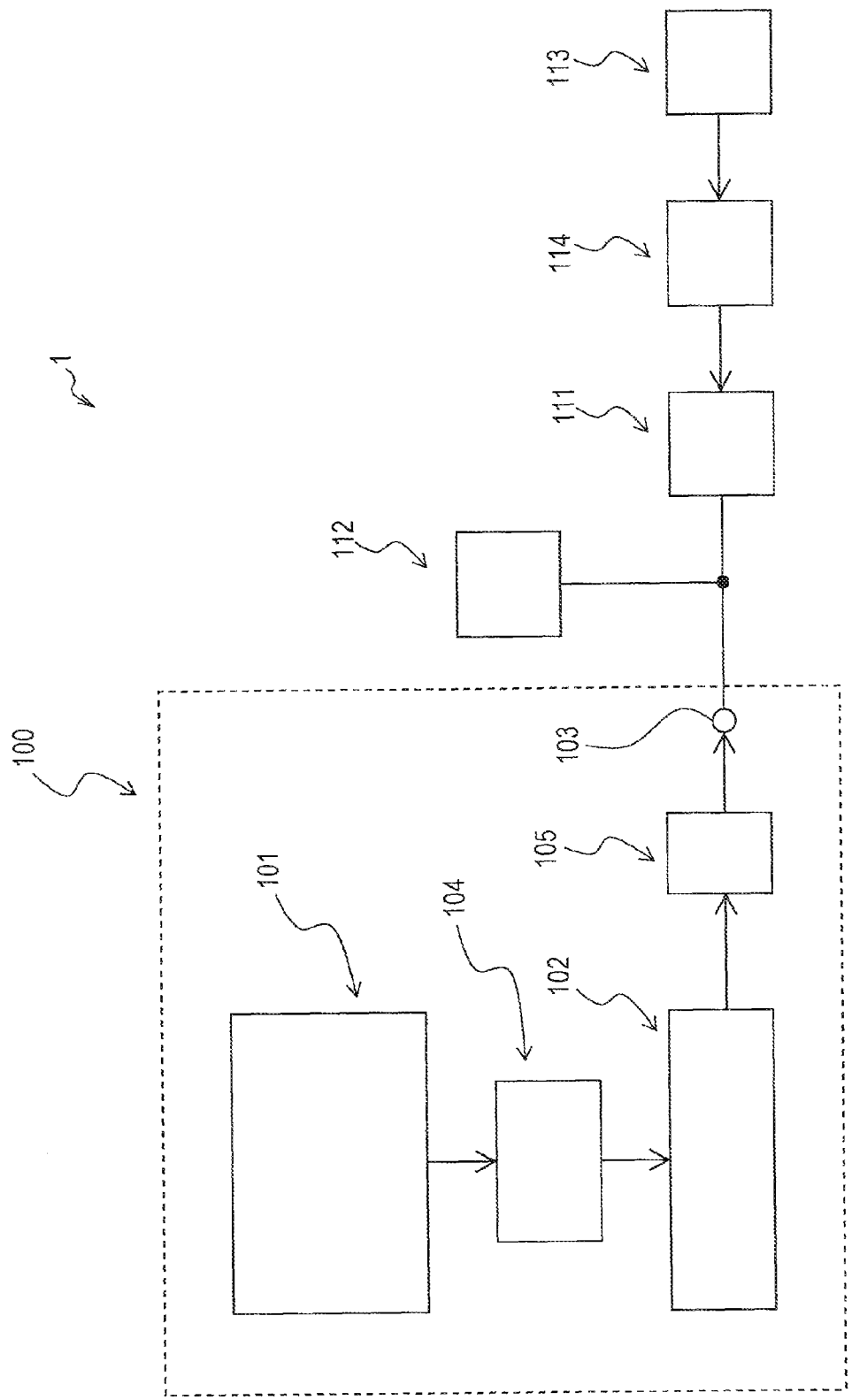
FIG. 1 is a block diagram that illustrates a schematic configuration of an in-vehicle electric system that is installed in an automobile according to one embodiment of the present invention.

One embodiment of the present invention will be described with reference to FIG. 1. FIG. 1 is a block diagram that illustrates a schematic configuration of an in-vehicle electric system 1 that is installed in an automobile according to this embodiment.

(Outline of In-Vehicle Solar System)

As illustrated in FIG. 1, an in-vehicle solar system 100 in the in-vehicle electric system 1 includes a solar battery module 101, a capacitor 102, a terminal 103, an MPPT module 104, and a converter 105.

The solar battery module 101 is formed with a single or plural solar battery cells and converts solar energy into power. The solar battery module 101 supplies generated power to the MPPT module 104.

The MPPT module 104 automatically tracks an optimal operating point so that maximum power is extracted from the solar battery module 101. Further, the MPPT module 104 converts the power from the solar battery module 101 into an appropriate voltage and supplies that to the capacitor 102.

Further, the MPPT module 104 monitors the voltage of the capacitor 102 and determines whether or not the capacitor 102 is in a fully charged state where an electricity amount accumulated in the capacitor 102 reaches an acceptable amount of the capacitor 102 from the voltage of the capacitor 102. The MPPT module 104 stops supply of power to the capacitor 102 in a case where a determination is made that the capacitor 102 is in the fully charged state.

The capacitor 102 temporarily accumulates power that is supplied from the solar battery module 101 via the MPPT module 104. The capacitor 102 supplies the accumulated power to the converter 105.

The converter 105 converts a voltage of a direct current (direct current voltage) that is supplied from the capacitor 102 into a prescribed voltage (raises or lowers the voltage) and outputs that to the terminal 103. A secondary battery 111 and a load 112 such as auxiliary equipment and electric components are connected to the terminal 103.

A charging device for supplying electric energy from the solar battery module 101 to the secondary battery 111 is configured with the MPPT module 104, the capacitor 102, the converter 105, and the terminal 103.

(Details of In-Vehicle Solar System)

A detailed description will next be made about configurations of the in-vehicle solar system 100.

As the solar battery cells that configure the solar battery module 101, a monocrystalline silicon cell, a polycrystalline silicon cell, an amorphous silicon cell, a compound semiconductor cell (GaAs-based, InGaAs-based, CuInSe-based (CIS-based), or the like), an organic thin film solar battery cell, a dye-sensitized solar battery, and the like may be used, for example. A rated power generation amount of the solar battery module 101 may be set to 50 W to 1 kW, for example. A battery area of the solar battery module 101 that corresponds to the rated power generation amount is 0.25 to 5 $m^2$ in a case where a silicon solar battery of conversion efficiency of 20% is used, for example.

An output voltage of the solar battery module 101 may be set to 2.5 to 100 V, for example. In a case where the voltage of the secondary battery 111 is 12 V, a voltage of 5 to 20 V that is close to 12 V is preferably set for the output voltage.

The most preferable installation location of the solar battery module 101 is a roof of the automobile. However, the solar battery module 101 may be separately arranged on a bonnet, doors, and the like.

The MPPT module 104 automatically tracks the optimal operating point in order to efficiently transmit the power generated by the solar battery module 101. Further, the MPPT module 104 has a built-in converter function that converts a direct current voltage in order to apply an appropriate voltage to the capacitor 102.

In a case where the output voltage of the solar battery module 101 is set such that an excessively high voltage is not applied to the capacitor 102, the MPPT module 104 is not necessarily needed. In this case, a reverse current protection circuit such as a diode may be provided instead of the MPPT module 104.

An electric double-layer capacitor with a large capacity may be used as the capacitor 102. Further, a rated voltage of the capacitor 102 may be set to 2.5 to 100 V. In a case where the voltage of the secondary battery 111 is 12 V, a voltage of 5 to 20 V that is close to 12 V is preferably set for the rated voltage.

The capacity of the capacitor 102 may be set to 50 to 1000 F in a case where the rated voltage of the capacitor 102 is set to 15 V, for example. In a case where the rated voltage is made 15 V by serially connecting capacitors of a rated voltage of 2.5 V, six capacitors of 300 to 6000 F may be serially connected.

As described above, the converter 105 raises or lowers the direct current voltage from the capacitor 102 to a prescribed voltage. The output voltage of the capacitor 102 fluctuates in accordance with an accumulated electric charge amount but may output a prescribed voltage by the converter 105. In a case where the voltage of the secondary battery 111 is 12 V of a lead storage battery, the output voltage of the converter 105 is preferably set to approximately 14.5 V.

Input-output power of the converter 105 is set to be sufficiently larger than a rated output of the solar battery module 101. The input-output power of the converter 105 is preferably set 2 to 100 times larger than the rated output of the solar battery module 101. For example, in a case where the rated output of the solar battery module 101 is 200 W, the input-output power of the converter 105 may be set to 1.5 kW.

In this embodiment, in a case where the capacitor 102 is in the fully charged state and the power has to be supplied to at least one of the secondary battery 111 and the load 112, the converter 105 converts (raises or lowers) the voltage of the power supplied from the capacitor 102 and then outputs the power to the terminal 103. On the other hand, in a case where the capacitor 102 is being charged or the power does not have to be supplied to the secondary battery 111 or the load 112, the converter 105 suspends the conversion of the voltage and the output to the terminal 103. In this case, the converter 105 consumes little power. Further, when the automobile is parked, an in-vehicle ECU does not have to be started to control the converter 105.

A determination of whether the capacitor 102 is being charged or in the fully charged state may be made by monitoring the voltage of the capacitor 102 by the converter 105. Further, a determination of whether or not the power has to be supplied to the secondary battery 111 may be made by directly monitoring the voltage of the secondary battery 111 by the converter 105 and may be made based on an instruction from a control device such as the in-vehicle ECU. Further, a determination of whether or not the power has to be supplied to the load 112 may be made based on an instruction from the control device.

The terminal 103 is provided to supply the power from the capacitor 102 to the secondary battery 111 and the load 112. The terminal 103 provides a boundary between the in-vehicle solar system 100 and the outside. Thus, the in-vehicle solar system 100 may be detachable at the terminal 103 or may not be detachable. Further, the terminal 103 may have a clear shape as a terminal or may not have a clear shape. Further, the converter 105 (the capacitor 102 in a case where the converter 105 is omitted) may directly be connected with the secondary battery 111 and the load 112 by a power supply line. In this case, any portion of the power supply line becomes the terminal 103.

(Other Configurations)

In this embodiment, the in-vehicle solar system 100 is used to charge the secondary battery 111 but may further be used to operate the load 112.

Further, using the lead storage battery of 12 V for the secondary battery 111 connected with the terminal 103 of the in-vehicle solar system 100 is a present main stream. However, a lead storage battery of another voltage, a nickel-metal hydride battery, a lithium ion battery, or the like may be used.

The load 112 connected with the terminal 103 of the in-vehicle solar system 100 may be various kinds of auxiliary equipment and electric components. Here, examples of the auxiliary equipment and the electric components include a starter, an ignition system (which are for a gasoline-powered vehicle), a headlight, a brake light, a direction indicator, an ECU, an air supply fan, an electric air conditioner, a stereo, a navigation system, and the like.

In a case where the automobile is a hybrid vehicle, a plug-in hybrid vehicle, or an electric vehicle, as illustrated in FIG. 1, the automobile is further provided with a high-voltage secondary battery 113 and a converter 114.

Here, an electric vehicle is a vehicle that travels with an electric motor and a battery. Further, a hybrid vehicle is a vehicle that travels with a combination of two or more kinds of motive power sources such as an engine and an electric motor, for example. Further, a plug-in hybrid vehicle is one kind of hybrid vehicle, in which a system that enables charging from an external power supply to the secondary battery for the electric motor installed in the vehicle is installed.

The high-voltage secondary battery 113 is used to drive the electric motor, the electric air conditioner, and the like. The converter 114 lowers the voltage of the power from the high-voltage secondary battery 113 and supplies power to charge the secondary battery 111 and to drive the load 112.

As described above, the in-vehicle solar system 100 of this embodiment converts solar energy into power, charges the in-vehicle secondary battery 111 by the power, and includes the solar battery module 101 that converts solar energy into power, the capacitor 102 that accumulates the power supplied from the solar battery module 101, and the terminal 103 that supplies the power from the capacitor 102 to the secondary battery 111 and the load 112.

In the above configuration, the power generated by the solar battery module 101 may temporarily be charged to the capacitor 102 that is capable of charge and discharge with a large current, and the power may be supplied from the capacitor 102 via the terminal 103 to the secondary battery 111 with a large current, thereby enabling a charge to the secondary battery 111. That is, the charge to the secondary battery 111 may intermittently be performed. Accordingly, circuits related to the charge such as the converter that is necessary for the charge to the secondary battery 111 and the ECU (not illustrated) of the automobile may intermittently be operated. Thus, the power consumption of the circuits related to the charge may be reduced compared to related art in which the circuits related to the charge are continuously operated. This enables efficient supply of the power generated by the solar battery module 101 to the secondary battery 111. As a result, fuel efficiency (fuel consumption) or power efficiency (power consumption) of the automobile may be improved.

This effect is significant when the output of the solar battery module 101 is low due to low sunshine or a small installation area. For example, in a case where the output of the solar battery module 101 is 50 W, the power consumption of the converter 105 is 30 W, and the generated power is directly supplied to the secondary battery 111, 60% of the output of the solar battery module 101 is lost as the power consumption of the converter 105. However, in a case where power of 1.5 kW is supplied from the capacitor 102 to the secondary battery 111, the loss due to the power consumption of the converter 105 becomes 2%.

Further, in this embodiment, the MPPT module 104 that has a maximum power point tracking function is provided between the solar battery module 101 and the capacitor 102. This allows the power generated by the solar battery module 101 to be efficiently supplied to the capacitor 102, thus enabling further efficient supply of the power generated by the solar battery module 101 to the secondary battery 111. As a result, the fuel efficiency or the power efficiency of the automobile may further be improved.

Further, in this embodiment, the converter that converts the voltage is provided between the capacitor 102 and the terminal 103. Accordingly, the in-vehicle solar system 100 applies a prescribed voltage to the secondary battery 111 by the converter 105 even if the voltage from the capacitor 102 lowers due to discharge from the capacitor 102. The power from the capacitor 102 may thus keep being output to the secondary battery 111. Thus, the capacitor 102 may increase a power amount per output. This results in a small capacity compared to a case where the converter 105 is not provided.

(Operation Example)

An operation example of the in-vehicle solar system 100 will be described below.

Here, an example is used where the rated voltage of the solar battery module 101 is 10 V, the rated power generation amount is 200 W, the rated voltage of the capacitor 102 is 15 V, and the capacitance is 200 F.

The in-vehicle solar battery module 101 converts solar energy into power. The power is charged to the capacitor 102 via the MPPT module 104. The MPPT module 104 automatically tracks the optimal operating point in order to efficiently supply the power generated by the solar battery module 101. Further, the MPPT module 104 raises the voltage of the power received from the solar battery module 101 to 15 V and charges the capacitor 102.

The voltage of the capacitor 102 rises as the electric charge accumulates. Thus, the output voltage of the MPPT module 104 is changed in response to the voltage of the capacitor 102, thereby enabling a further improvement in charge efficiency.

The time from an empty charged state of the capacitor 102 to the fully charged state is 225 seconds in a case where the solar battery module 101 provides the rated output. Further, the time is 112.5 seconds in a case where the output voltage of the MPPT module 104 is changed in response to the voltage of the capacitor 102.

The charge to the secondary battery 111 is performed by the power accumulated in the capacitor 102. Further, the power may be supplied to the load 112 that is various kinds of auxiliary equipment and electric components to make those operate. The maximum power accumulated in the capacitor 102 is 22.5 kWs in a case where the voltage is 15 V and the capacitance is 200 F.

The power accumulated in the capacitor 102 is converted into 12 V, for example, by the converter 105, and the secondary battery 111 is charged with power of 1.5 kW (that is, a current of 125 A), for example. In this case, all the power accumulated in the capacitor 102 is moved to the secondary battery 111 in 15 seconds, and the converter 105 stops. That is, the converter 105 does not have to always operate but may operate for 15 seconds in a charge-discharge cycle of the capacitor 102.

In this operation example, the in-vehicle solar system 100 directly supplies the power to the load 112 that is various kinds of auxiliary equipment and electric components in addition to the charge to the secondary battery 111. In this case, because the directly supplied power of the power that is output from the in-vehicle solar system 100 and once charged to the secondary battery 111 is not supplied to the load 112, charge-discharge loss by the secondary battery 111 is avoided. Accordingly, the fuel efficiency or the power efficiency of the automobile is further improved.

[Second Embodiment]

Figure 2:
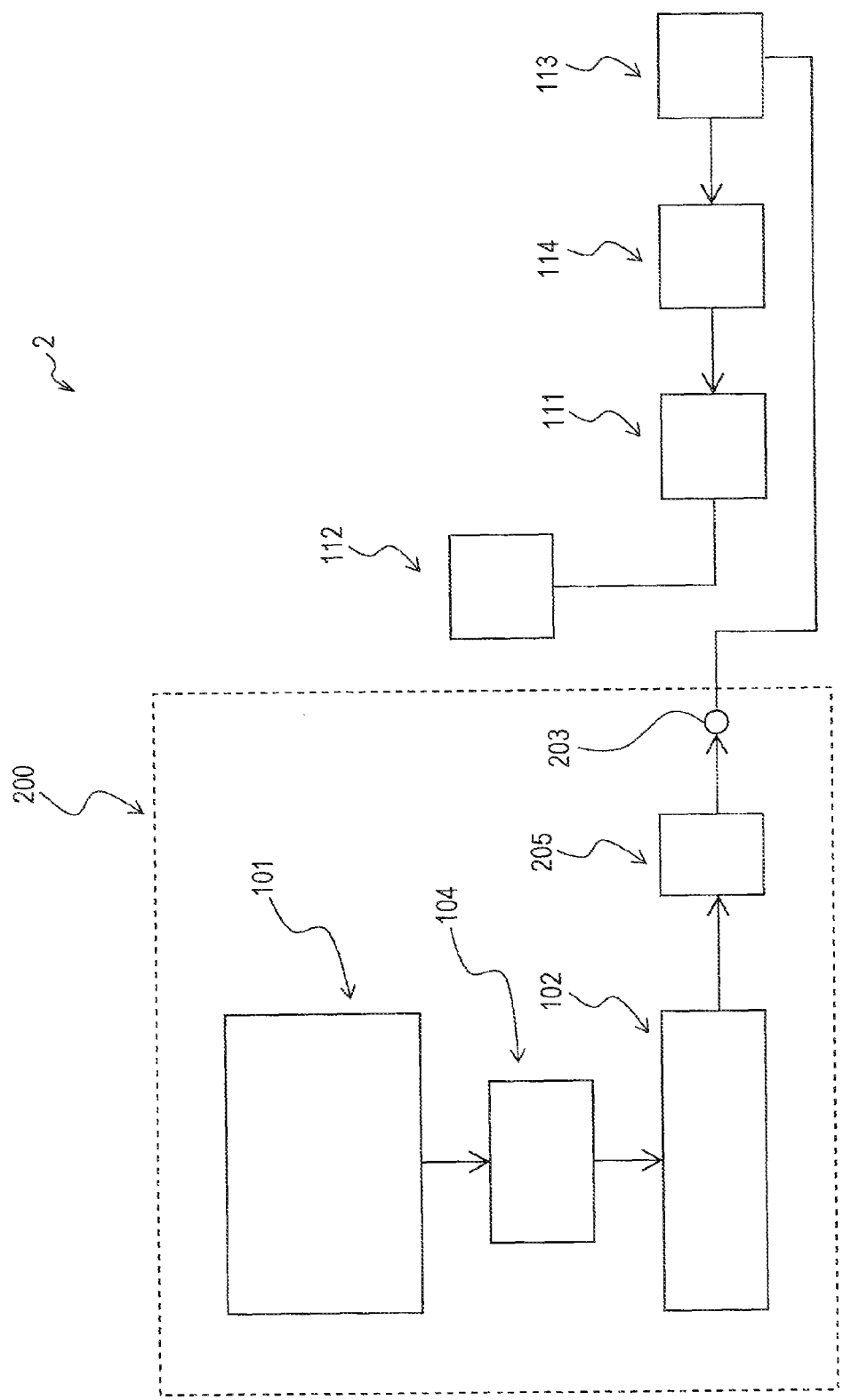
FIG. 2 is a block diagram that illustrates a schematic configuration of an in-vehicle electric system that is installed in an automobile according to another embodiment of the present invention.

Another embodiment of the present invention will next be described with reference to FIG. 2. FIG. 2 is a block diagram that illustrates a schematic configuration of an in-vehicle electric system in an automobile according to this embodiment. The same reference numerals are provided to configurations that have the similar functions to the configuration that is described in the above embodiment, and a description thereof will not be made.

An in-vehicle electric system 2 of this embodiment is different compared to the in-vehicle electric system 1 illustrated in FIG. 1 in a point that an in-vehicle solar system 200 is provided instead of the in-vehicle solar system 100, and other configurations are similar. The in-vehicle solar system 200 of this embodiment is different compared to the in-vehicle solar system 100 illustrated in FIG. 1 in a point that a converter 205 and a terminal 203 are provided instead of the converter 105 and the terminal 103, and other configurations are similar.

The terminal 203 in this embodiment is connected with the high-voltage secondary battery 113 instead of the secondary battery 111 compared to the terminal 103 illustrated in FIG. 1. Accordingly, the voltage of the converter 205 in this embodiment is raised from the voltage for charging the secondary battery 111 to the voltage for charging the high-voltage secondary battery 113 compared to the converter 105 illustrated in FIG. 1.

(Operation Example)

An operation example of the in-vehicle solar system 200 illustrated in FIG. 2 will be described below. The operation performed until the charge of the power generated by the solar battery module 101 to the capacitor 102 via the MPPT module 104 is similar to the in-vehicle solar system 100 illustrated in FIG. 1.

The charge to the high-voltage secondary battery 113 is performed by the power accumulated in the capacitor 102. The maximum power accumulated in the capacitor 102 is 22.5 kWs in a case where the voltage is 15 V and the capacitance is 200 F.

The power accumulated in the capacitor 102 is converted into 300 V, for example, by the converter 205, and the high-voltage secondary battery 113 is charged with power of 1.5 kW (that is, a current of 5 A), for example. In this case, all the power accumulated in the capacitor 102 is moved to the high-voltage secondary battery 113 in 15 seconds, and the converter 205 stops. That is, the converter 205 does not have to always operate but may operate for 15 seconds in the charge-discharge cycle of the capacitor 102.

[Third Embodiment]

Figure 3:
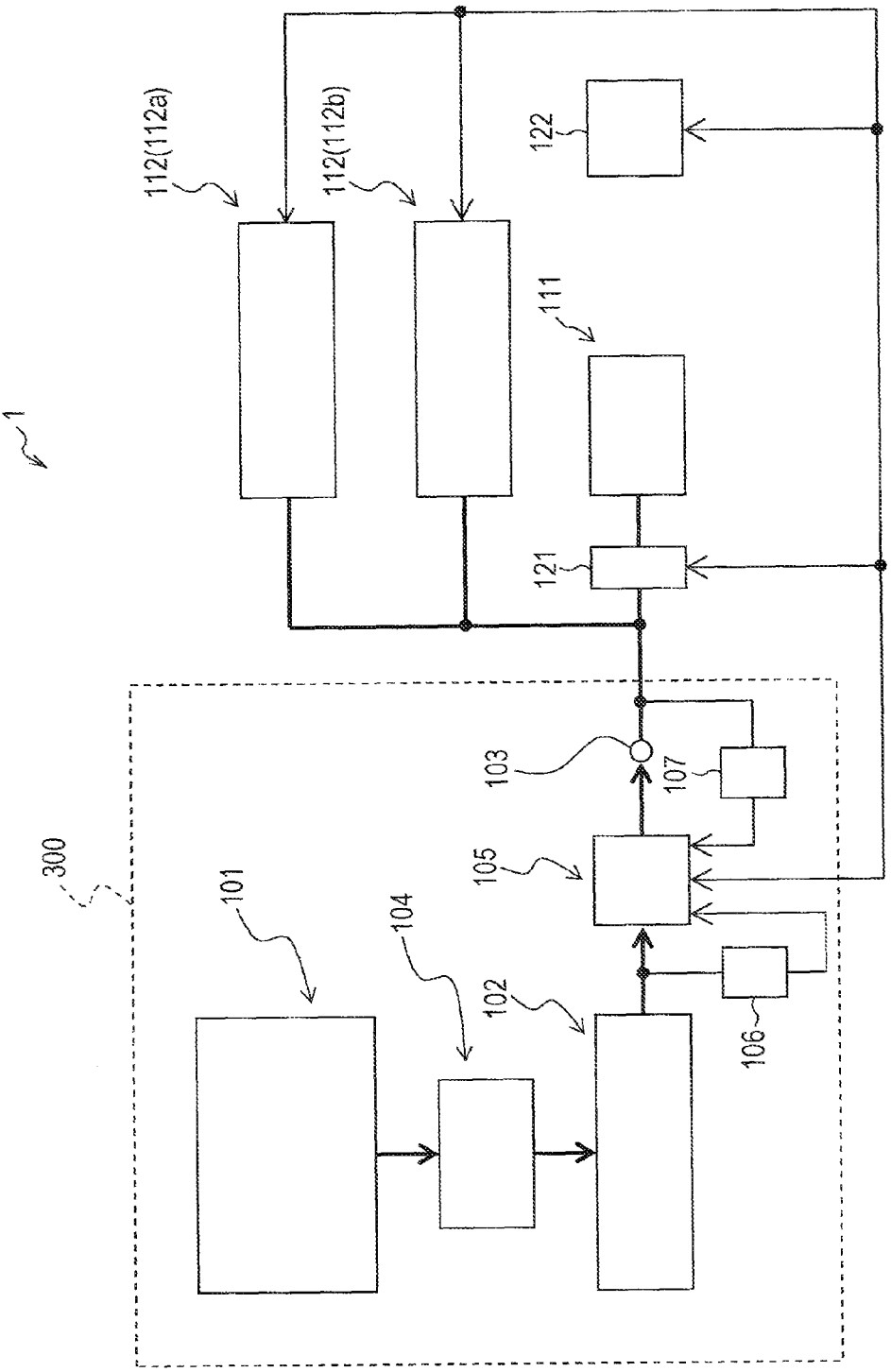
FIG. 3 is a block diagram that illustrates a schematic configuration of an in-vehicle electric system that is installed in an automobile according to still another embodiment of the present invention.

Still another embodiment of the present invention will be described with reference to FIGS. 3 and 4. FIG. 3 is a block diagram that illustrates a schematic configuration of the in-vehicle electric system (electric system) 1 that is installed in an automobile (vehicle) according to this embodiment. The same reference numerals are provided to configurations that have the similar functions to the configurations that are described in the above embodiments, and a description thereof will not be made.

(Outline of In-Vehicle Electric System)

As illustrated in FIG. 3, the in-vehicle electric system 1 of this embodiment includes an in-vehicle solar system 300, loads 112, the secondary battery 111, a battery management unit (BMU) 121, and an electronic control unit (ECU) 122. In this embodiment, two loads 112 are provided and denoted as "first load 112*a*" and "second load 112*b*".

In FIG. 3, power supply lines are indicated by bold lines, and signal lines are indicated by thin lines. The power supply lines are connected with the in-vehicle solar system 300 and the loads 112*a* and 112*b* and further with the secondary battery 111 via the BMU 121. Further, the signal lines are connected with the in-vehicle solar system 300, the loads 112*a* and 112*b*, and the BMU 121.

(Outline of In-Vehicle Solar System)

As illustrated in FIG. 3, the in-vehicle solar system 300 includes the solar battery module 101, the capacitor 102, the terminal 103, the MPPT module 104, the converter 105, a capacitor voltage sensor 106, and an output voltage sensor 107.

The capacitor voltage sensor 106 detects the voltage of the capacitor 102 and is provided on the power supply line from the capacitor 102 to the converter 105. The capacitor voltage sensor 106 transmits the detected voltage of the capacitor 102 to the converter 105.

The output voltage sensor 107 detects an output side voltage of the terminal 103 and is provided on the power supply line on the output side of the terminal 103. The output voltage sensor 107 transmits the detected output side voltage to the converter 105.

A power supply device for supplying electric energy from the solar battery module 101 to the loads 112a and 112b is configured with the MPPT module 104, the capacitor 102, the converter 105, the terminal 103, and the voltage sensors 106 and 107.

(Details of In-Vehicle Solar System)

A detailed description will next be made about configurations of the in-vehicle solar system 300. A description will be made below about portions that are different from the in-vehicle solar system 100 illustrated in FIG. 1, and a description of similar portions will not be made.

An output voltage of the solar battery module 101 may be set to 2.5 to 100 V, for example. In a case where the voltage of the loads 112a and 112b and the secondary battery 111 is 12 V, a voltage of 5 to 20 V that is close to 12 V is preferably set for the output voltage.

An electric double-layer capacitor with a large capacity may be used as the capacitor 102. Further, a rated voltage of the capacitor 102 may be set to 2.5 to 100 V. In a case where the voltage of the loads 112a and 112b and the secondary battery 111 is 12 V, a voltage of 5 to 20 V that is close to 12 V is preferably set for the rated voltage.

In this embodiment, the capacity of the capacitor 102 may be set to 5 to 1000 F in a case where the rated voltage of the capacitor 102 is set to 15 V, for example. In a case where the rated voltage is made 15 V by serially connecting capacitors of a rated voltage of 2.5 V, six capacitors of 30 to 6,000 F may be serially connected.

The input-output power of the converter 105 is set in accordance with what kinds of loads 112a and 112b are driven. For example, in a case where the loads 112a and 112b include a starter, the input-output power is preferably set to 1 kW or higher.

In this embodiment, in a case where the capacitor 102 is in the fully charged state and the power has to be supplied to at least one of the loads 112a and 112b, the converter 105 converts (raises or lowers) the voltage of the power supplied from the capacitor 102 and then outputs the power to the terminal 103. On the other hand, in a case where the capacitor 102 is being charged or the power does not have to be supplied to the loads 112a or 112b, the converter 105 suspends the conversion of the voltage and the output to the terminal 103. In this case, the converter 105 consumes little power. Further, when the automobile is parked, the in-vehicle ECU 122 does not have to be started to control the converter 105.

The converter 105 receives the voltage of the capacitor 102 from the capacitor voltage sensor 106 and monitors the voltage, and a determination of whether the capacitor 102 is being charged or in the fully charged state may thereby be made. Further, the converter 105 receives the output side voltage of the terminal 103 from the output voltage sensor 107 and monitors the output side voltage, and a determination of whether or not the power has to be supplied to at least one of the loads 112a and 112b may thereby be made.

(Other Configurations)

In this embodiment, the in-vehicle solar system 300 is used to supply the power to the loads 112a and 112b connected with the in-vehicle solar system 300 and make those operate but may further be used to charge the secondary battery 111.

The first load 112a connected with the terminal 103 of the in-vehicle solar system 300 is a starter that starts an engine (internal combustion engine), for example. The starter usually consumes power of approximately 1 kW. The drive current approaches 100 A in a case where the drive voltage is 12 V. In a case of a start-stop vehicle, the time to drive the starter is around 0.5 second. In a case of manually starting the engine, the starter may be driven for a longer time than that.

The second load 112b connected with the terminal 103 of the in-vehicle solar system 300 is various kinds of auxiliary equipment and electric components other than the starter, for example. Examples of the auxiliary equipment and the electric components include the ignition system, the headlight, the brake light, the direction indicator, the ECU, the air supply fan, the electric air conditioner, the stereo, the navigation system, and the like.

The BMU 121 controls and protects the secondary battery 111. That is, the charge and discharge of the secondary battery 111 is controlled by the BMU 121.

The ECU 122 performs integrated control of various kinds of devices in the in-vehicle electric system 1. Specifically, the ECU 122 collects information from the various kinds of devices and instructs the various kinds of devices on operations based on the collected information. In an example of FIG. 3, the ECU 122 performs the collection of information and the instructions on operations for the converter 105, the loads 112a and 112b, and the BMU 121.

(Operation of In-Vehicle Solar System)

An operation of the in-vehicle solar system 300 in the above configuration will be described with reference to FIG. 4. FIG. 4 is a flowchart that illustrates a flow of an operation of the converter 105 in the in-vehicle solar system 300.

Figure 4:
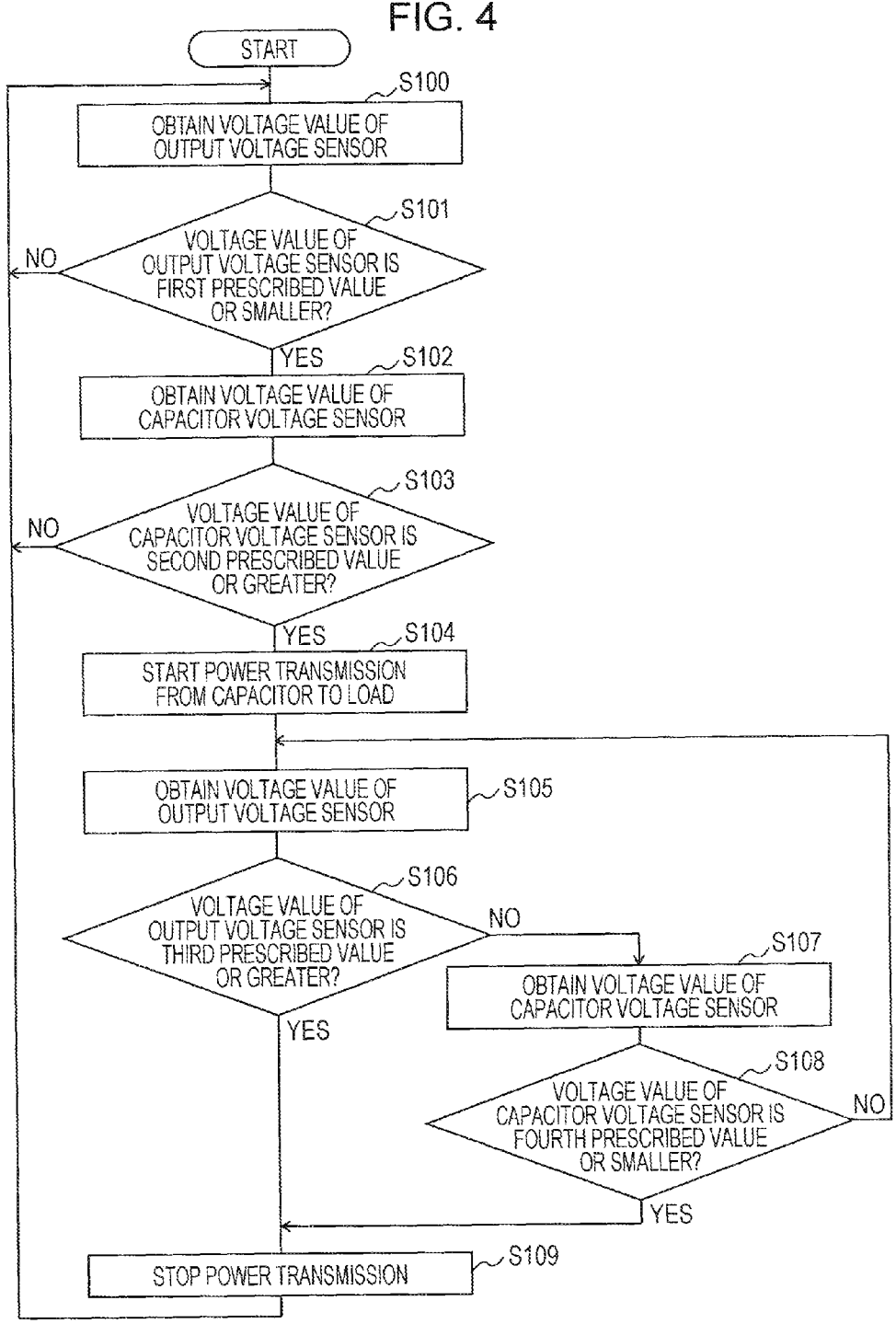
FIG. 4 is a flowchart that illustrates a flow of an operation of an in-vehicle solar system in the in-vehicle electric system.

As illustrated in FIG. 4, the converter 105 first obtains a voltage value of the output voltage sensor 107 (S100) and determines whether or not the obtained voltage value of the output voltage sensor 107 is a first prescribed value or smaller (S101). The first prescribed value is for a determination of necessity of power transmission to the loads 112a and 112b. In a case where the voltage value of the output voltage sensor 107 is greater than the first prescribed value, a determination is made that the power transmission from the in-vehicle solar system 300 to the loads 112a and 112b is unnecessary, the operation returns to step S100, and the above operations are repeated.

On the other hand, in a case where the voltage value of the output voltage sensor 107 is the first prescribed value or smaller, the converter 105 obtains a voltage value of the capacitor voltage sensor 106 (S102) and determines whether or not the obtained voltage value of the capacitor voltage sensor 106 is a second prescribed value or greater (S103). The second prescribed value is for a determination about whether or not sufficient power is accumulated in the capacitor 102. In a case where the voltage value of the capacitor voltage sensor 106 is smaller than the second prescribed value, a determination is made that the power transmission from the in-vehicle solar system 300 to the loads 112a and 112b is not sufficient, the operation returns to step S100, and the above operations are repeated.

Further, in a case where the voltage value of the capacitor voltage sensor 106 is the second prescribed value or greater, the converter 105 starts the power transmission from the capacitor 102 to the loads 112a and 112b (S104).

The converter 105 next obtains the voltage value of the output voltage sensor 107 (S105) and determines whether or not the obtained voltage value of the output voltage sensor 107 is a third prescribed value or greater (S106). The third prescribed value is for determinations of whether or not the power transmission to the loads 112a and 112b is unnecessary and whether or not the voltages of the loads 112a and 112b are abnormal. In a case where the voltage value of the output voltage sensor 107 is the third prescribed value or greater, a determination is made that the power transmission from the in-vehicle solar system 300 to the loads 112a and 112b is unnecessary, the power transmission from the capacitor 102 to the loads 112a and 112b is stopped (S109), the operation thereafter returns to step S100, and the above operations are repeated.

On the other hand, in a case where the voltage value of the output voltage sensor 107 is smaller than the third prescribed value, the converter 105 obtains the voltage value of the capacitor voltage sensor 106 (S107) and determines whether or not the obtained voltage value of the capacitor voltage sensor 106 is a fourth prescribed value or smaller (S108). The fourth prescribed value is for a determination about whether or not sufficient power remains in the capacitor 102. In a case where the voltage value of the capacitor voltage sensor 106 is greater than the fourth prescribed value, a determination is made that sufficient power remains in the capacitor 102, the operation returns to step S105, and the above operations are repeated. However, in a case where the voltage value of the capacitor voltage sensor 106 is the fourth prescribed value or smaller, a determination is made that sufficient power does not remain in the capacitor 102, the power transmission is stopped (S109), the operation thereafter returns to step S100, and the above operations are repeated.

The orders of the operations of steps S100 and S101 that are related to the output voltage sensor 107 and the operations of steps S102 and S103 that are related to the capacitor voltage sensor 106 may be interchanged. Similarly, the orders of the operations of steps S105 and S106 that are related to the output voltage sensor 107 and the operations of steps S107 and S108 that are related to the capacitor voltage sensor 106 may be interchanged. Further, the first prescribed value may be the same as the third prescribed value. Similarly, the second prescribed value may be the same as the fourth prescribed value.

As described above, the in-vehicle solar system 300 of this embodiment converts solar energy into power, supplies the power to the in-vehicle loads 112a and 112b, and includes the solar battery module 101 that converts solar energy into power, the capacitor 102 that accumulates the power supplied from the solar battery module 101, and the terminal 103 that supplies the power from the capacitor 102 to the loads 112a and 112b and the secondary battery 111.

The above configuration enables the charge and discharge with a large current and application of a large current in a short time from the capacitor 102 that has almost no limit of the number of the charge and discharge to the loads 112a and 112b. Accordingly, the frequency of application of a large current in a short time from the secondary battery 111 to the loads 112a and 112b may be reduced. As a result, degradation of the secondary battery 111 may be hindered.

In addition, the power accumulated in the capacitor 102 is supplied from the solar battery module 101 and is not supplied from a generator connected with the engine. Thus, the fuel efficiency of the automobile in which the in-vehicle solar system 300 is installed may be improved.

Because the power generated by the solar battery module 101 is proportional to a total area of the solar battery cells, a large current may not be obtained in a case where a mounting area is limited as the automobile. Further, the power generated by the solar battery module 101 always fluctuates in accordance with solar irradiance. The power generated by the solar battery module 101 is temporarily accumulated in the capacitor 102, and a large current may thereby be extracted from the capacitor 102. This enables both of an improvement in the fuel efficiency of the automobile and reduction in degradation of the secondary battery 111.

Further, in this embodiment, the MPPT module 104 that has the maximum power point tracking function is provided between the solar battery module 101 and the capacitor 102. This allows the power generated by the solar battery module 101 to be efficiently supplied to the capacitor 102, thus enabling further efficient supply of the power generated by the solar battery module 101 to the loads 112a and 112b. As a result, the fuel efficiency or the power efficiency of the automobile may further be improved.

Further, in this embodiment, the converter that converts the voltage is provided between the capacitor 102 and the terminal 103. Accordingly, the in-vehicle solar system 300 applies a prescribed voltage to the loads 112a and 112b by the converter 105 even if the voltage from the capacitor 102 lowers due to discharge from the capacitor 102. Stops of operations of the loads 112a and 112b due to the lowered output voltage may thus be avoided. Further, the capacitor 102 may increase the power amount per output. This results in a small capacity compared to a case where the converter 105 is not provided.

(First Operation Example)

A first operation example of the in-vehicle solar system 300 will next be described.

Here, an example is used where the rated voltage of the solar battery module 101 is 5 V, the rated power generation amount is 50 W, the rated voltage of the capacitor 102 is 15 V, and the capacitance is 20 F.

The in-vehicle solar battery module 101 converts solar energy into power. The power is charged to the capacitor 102 via the MPPT module 104. The MPPT module 104 automatically tracks the optimal operating point in order to efficiently supply the power generated by the solar battery module 101. Further, the MPPT module 104 raises the voltage of the power received from the solar battery module 101 to 15 V and charges the capacitor 102.

The voltage of the capacitor 102 rises as the electric charge accumulates. Thus, the output voltage of the MPPT module 104 is changed in response to the voltage of the capacitor 102, thereby enabling a further improvement in charge efficiency.

The time from the empty charged state of the capacitor 102 to the fully charged state is 90 seconds in a case where the solar battery module 101 provides the rated output. Further, the time is 45 seconds in a case where the output voltage of the MPPT module 104 is changed in response to the voltage of the capacitor 102. When the capacitor 102 becomes the fully charged state, the MPPT module 104 suspends the operation.

The power accumulated in the capacitor 102 is supplied to drive the first load 112a that is the starter, as necessary. The starter is driven preferably in a case where the engine is started to cancel a start-stop state in the automobile that includes a start-stop function.

In a case where the power accumulated in the capacitor 102 is used, the voltage is converted into 12 V by the converter 105, for example. The voltage of the capacitor 102 lowers as an accumulated electric charge (power amount) is lost. However, the output voltage may be maintained constant by the converter 105.

The power output from the converter 105 is supplied to the first load 112a that is the starter via the terminal 103. The maximum power accumulated in the capacitor 102 is 2.25 kWs in a case where the voltage is 15 V and the capacitance is 20 F. Thus, the starter may be driven for two seconds in a case where the starter consumes power of 1 kW. This is a sufficient time for restarting the engine.

When the driving of the first load 112a that is the starter is finished, the output of the converter 105 stops, and the charge from the solar battery module 101 to the capacitor 102 is resumed.

In the first operation example, the in-vehicle solar system 300 supplies the power to drive the starter that needs large power although for a short time. Further, the charge and discharge with a large current is easy with the capacitor 102 compared to the secondary battery 111, and the capacitor 102 has almost no limit of the number of the charge and discharge. Accordingly, an effect of hindering voltage lowering and degradation of the secondary battery is significant compared to a case where the first load 112a is driven by the secondary battery 111.

Particularly, in a case where the automobile in which the in-vehicle solar system 300 is installed has the start-stop function, the frequency of use of the starter becomes very high, and the effect of hindering voltage lowering and degradation of the secondary battery thus becomes particularly significant.

(Second Operation Example)

A second operation example of the in-vehicle solar system 300 will next be described. A description will be made below about points that are different from the first operation example, and a description of similar points will not be made.

Here, an example is used where the rated voltage of the solar battery module 101 is 10 V, the rated power generation amount is 200 W, the rated voltage of the capacitor 102 is 15 V, and the capacitance is 200 F.

The time from the empty charged state of the capacitor 102 to the fully charged state is 225 seconds in a case where the solar battery module 101 provides the rated output. Further, the time is 112.5 seconds in a case where the output voltage of the MPPT module 104 is changed in response to the voltage of the capacitor 102. When the capacitor 102 becomes the fully charged state, the MPPT module 104 suspends the operation.

The power accumulated in the capacitor 102 is supplied to operate the second load 112b that is various kinds of auxiliary equipment and electric components, as necessary. In addition, the power accumulated in the capacitor 102 may be supplied to drive the first load 112a that is the starter. The second load 112b is operated preferably while engine idling is stopped in the automobile that includes the start-stop function. The operation is not limited to the time during which the engine idling is stopped, but the second load 112b may be operated during normal travel.

The power output from the converter 105 is supplied to the second load 112b that is the auxiliary equipment and the electric components via the terminal 103. The maximum power accumulated in the capacitor 102 is 22.5 kWs in a case where the voltage is 15 V and the capacitance is 200 F. Accordingly, the second load 112b may be driven for 90 seconds in a case where the power consumption of the second load 112b is 250 W. If the second load 112b is driven while the engine idling is stopped, the power is supplemented in many cases while the engine idling is stopped.

When the driving of the second load 112b is finished, the output of the converter 105 stops, and the charge from the solar battery module 101 to the capacitor 102 is resumed.

(Third Operation Example)

A third operation example of the in-vehicle solar system 300 will next be described. A description will be made below about points that are different from the first operation example, and a description of similar points will not be made.

Here, an example is used where the rated voltage of the solar battery module 101 is 10 V, the rated power generation amount is 200 W, the rated voltage of the capacitor 102 is 15 V, and the capacitance is 200 F.

The time from the empty charged state of the capacitor 102 to the fully charged state is 225 seconds in a case where the solar battery module 101 provides the rated output. Further, the time is 112.5 seconds in a case where the output voltage of the MPPT module 104 is changed in response to the voltage of the capacitor 102. When the capacitor 102 becomes the fully charged state, the MPPT module 104 suspends the operation.

The power accumulated in the capacitor 102 drives at least one of the first load 112a that is the starter and the second load 112b that is the various kinds of auxiliary equipment and electric components and is also used to charge the secondary battery 111. The maximum power accumulated in the capacitor 102 is 22.5 kWs in a case where the voltage is 15 V and the capacitance is 200 F.

When the driving of the first load 112a, the operation of the second load 112b, and the charge to the secondary battery 111 are finished, the output of the converter 105 stops, and the charge from the solar battery module 101 to the capacitor 102 is resumed.

In this operation example, the in-vehicle solar system 300 performs the charge to the secondary battery 111. The power of the secondary battery 111 is usually supplied from the generator by using the motive power of the engine. Accordingly, the in-vehicle solar system 300 charges the secondary battery 111, thereby enabling a significant improvement in the fuel efficiency of the automobile.

Because the power generated by the solar battery module 101 is temporarily accumulated in the capacitor 102, the secondary battery 111 may be charged with a large current (power) compared to the current (power) generated by the solar battery module 101, and further the secondary battery 111 may intermittently be charged. Accordingly, an operation time of the converter 105 is reduced, and the power generated by the solar battery module 101 may thereby be supplied efficiently to the secondary battery 111.

This effect is significant when the output of the solar battery module 101 is low due to low sunshine or a small installation area. For example, in a case where the output of the solar battery module 101 is 50 W, the power consumption of the converter 105 is 30 W, and the generated power is directly supplied to the loads 112a and 112b, 60% of the output of the solar battery module 101 is lost as the power consumption of the converter 105. However, in a case where power of 1 kW is supplied from the capacitor 102 to the loads 112a and 112b, the loss due to the power consumption of the converter 105 becomes 3%.

[Fourth Embodiment]

Yet another embodiment of the present invention will next be described with reference to FIG. 5. An in-vehicle electric system according to this embodiment is different compared to the in-vehicle electric system 1 illustrated in FIG. 3 in a point that the output voltage sensor 107 is omitted, and other configurations are similar. A block diagram that illustrates a schematic configuration of the in-vehicle electric system 1 of this embodiment is not provided. The same reference characters are provided to configurations that have the similar functions to the configurations that are described in the above embodiments, and a description thereof will not be made.

In the in-vehicle electric system 1 illustrated in FIG. 3, the converter 105 receives the output side voltage of the terminal 103 from the output voltage sensor 107 and monitors the output side voltage, and a determination of whether or not the power has to be supplied to the loads 112a and 112b is thereby made. However, in the in-vehicle electric system 1 of this embodiment, the converter 105 makes a determination of whether or not the power has to be supplied to the loads 112a and 112b based on an instruction from the ECU 122.

An operation of the in-vehicle solar system 300 in the in-vehicle electric system 1 of this embodiment will be described with reference to FIG. 5. FIG. 5 is a flowchart that illustrates a flow of the operation of the converter 105 in the in-vehicle solar system 300. The operation of the converter 105 illustrated in FIG. 5 is different compared to the operation of the converter 105 illustrated in FIG. 4 in points that step S110 is provided instead of steps S100 and S101 and step S111 is provided instead of step S105 and S106, and other operations are similar.

Figure 5:
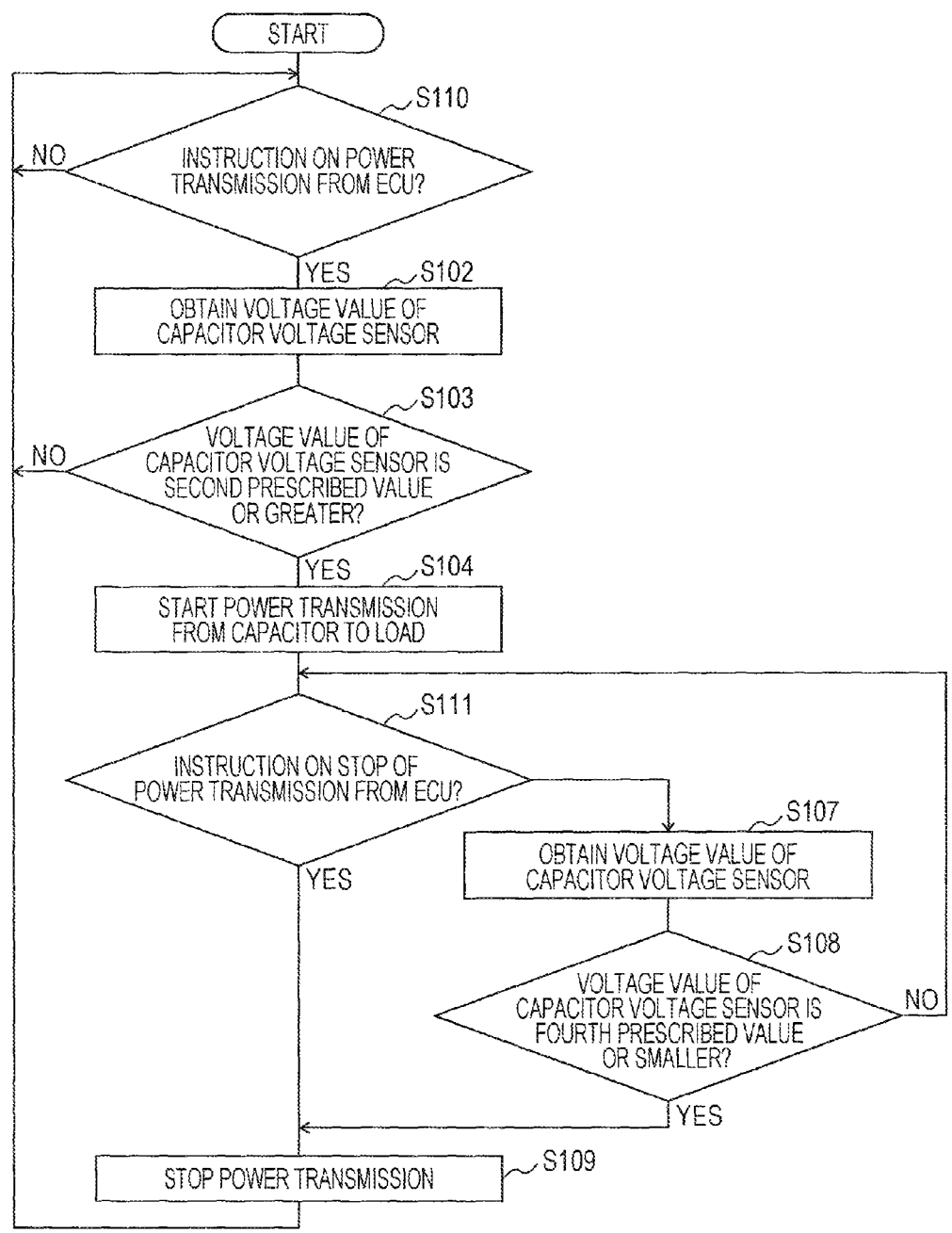
FIG. 5 is a flowchart that illustrates a flow of an operation of an in-vehicle solar system in an in-vehicle electric system that is installed in an automobile according to yet another embodiment of the present invention.

As illustrated in FIG. 5, the converter 105 first stands by until an instruction on power transmission from the in-vehicle solar system 300 to the loads 112a and 112b is provided from the ECU 122 (S110). When the instruction on the power transmission is provided, steps S102 and S103 are performed. In a case where the voltage value of the capacitor voltage sensor 106 is smaller than the above-described second prescribed value, a determination is made that the voltage value is not sufficient for the power transmission, the operation returns to step S110, and the above operations are repeated.

On the other hand, in a case where the voltage value of the capacitor voltage sensor 106 is the second prescribed value or greater, the converter 105 determines that the voltage value is sufficient for the power transmission and starts the power transmission from the capacitor 102 to the loads 112a and 112b (S104).

The converter 105 next determines whether or not an instruction on a stop of the power transmission is provided from the ECU 122 (S111). In a case where the instruction on a stop of the power transmission is provided, the power transmission from the capacitor 102 to the loads 112a and 112b is stopped (S109), the operation thereafter returns to step S110, and the above operations are repeated.

On the other hand, in a case where the instruction on a stop of the power transmission is not provided from the ECU 122, steps S107 and S108 are performed. In a case where the voltage value of the capacitor voltage sensor 106 is greater than the above-described fourth prescribed value, a determination is made that sufficient power remains in the capacitor 102, the operation returns to step S111, and the above operations are repeated. However, in a case where the voltage value of the capacitor voltage sensor 106 is the fourth prescribed value or smaller, a determination is made that sufficient power does not remain in the capacitor 102, the power transmission is stopped (S109), the operation thereafter returns to step S100, and the above operations are repeated.

As described above, the converter 105 may perform or stop the power transmission to the loads 112a and 112b based on the instructions from the ECU 122 even if the output voltage sensor 107 is not provided.

[Fifth Embodiment]

Figure 6:
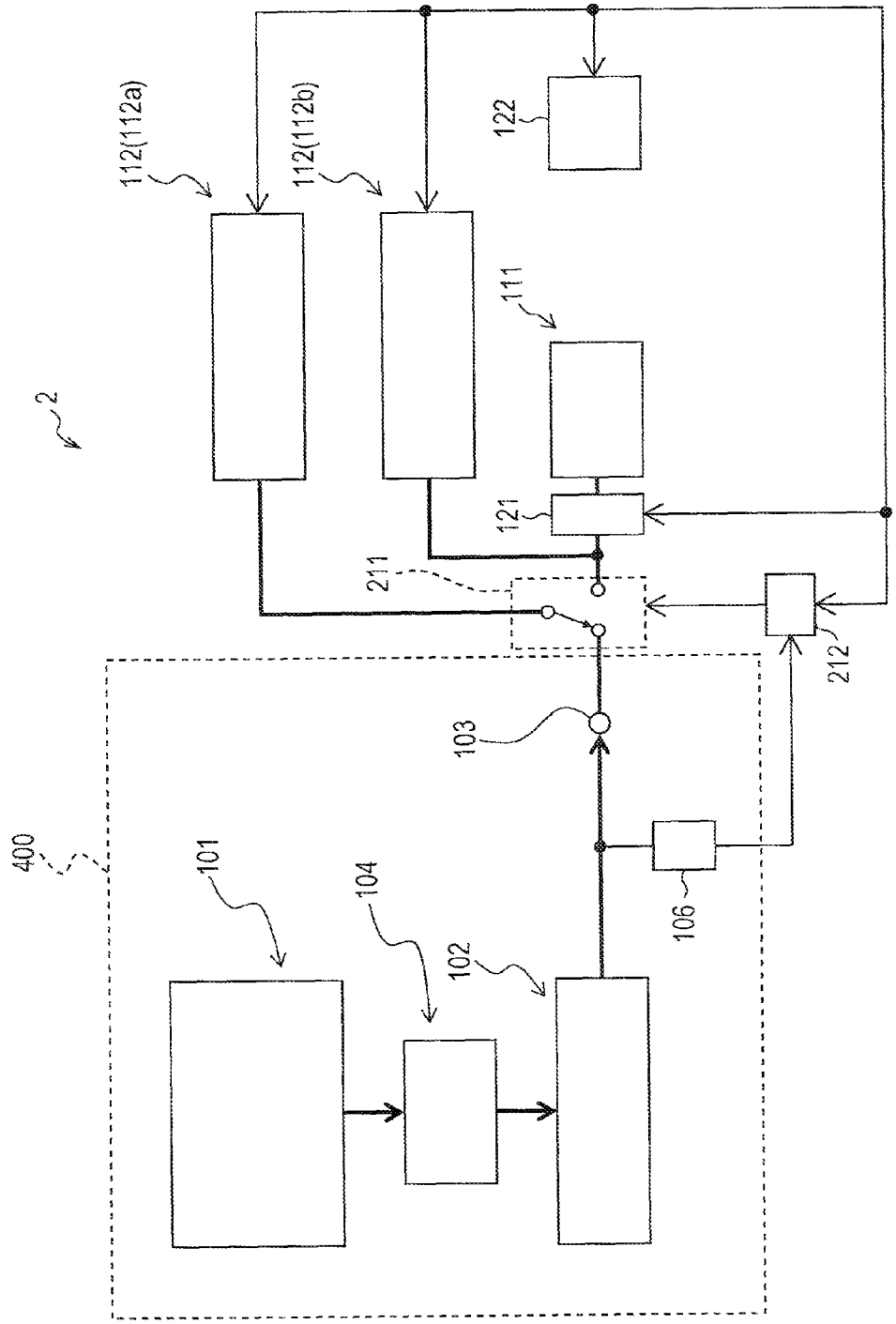
FIG. 6 is a block diagram that illustrates a schematic configuration of an in-vehicle electric system that is installed in an automobile according to further another embodiment of the present invention.

Further another embodiment of the present invention will next be described with reference to FIGS. 6 and 7. FIG. 6 is a block diagram that illustrates a schematic configuration of an in-vehicle electric system in an automobile according to this embodiment. The same reference characters are provided to configurations that have the similar functions to the configurations that are described in the above embodiments, and a description thereof will not be made.

(Configuration of In-Vehicle Electric System)

The in-vehicle electric system 2 of this embodiment is different compared to the in-vehicle electric system 1 illustrated in FIG. 3 in points that an in-vehicle solar system 400 is provided instead of the in-vehicle solar system 300, a switch (switching means) 211 is provided among the in-vehicle solar system 400, the loads 112a and 112b, and the secondary battery 111, and a switch controller 212 that controls the switch 211 is provided, and other configurations are similar. The in-vehicle solar system 400 of this embodiment is different compared to the in-vehicle solar system 300 illustrated in FIG. 3 in a point that the converter 105 and the output voltage sensor 107 are omitted, and other configurations are similar. Thus, the capacitor 102 is directly connected with the terminal 103 not via the converter.

The switch 211 switches connections of the first load 112a to either one of the in-vehicle solar system 400 side and the secondary battery 111 side. Further, the in-vehicle solar system 400 is configured not to be connected with the second load 112b and the secondary battery 111 because of the presence of the switch 211. Accordingly, the first load 112a is supplied with the power from either one of the in-vehicle solar system 400 and the secondary battery 111. Meanwhile, the second load 112b is not supplied with the power from the in-vehicle solar system 400 and is supplied only with the power from the secondary battery 111.

The switch controller 212 controls switching by the switch 211 based on an instruction from the ECU 122 and the voltage value from the capacitor voltage sensor 106 of the in-vehicle solar system 400.

(Operation of In-Vehicle Electric System)

An operation of the in-vehicle electric system 2 in the above configuration will be described with reference to FIG. 7. FIG. 7 is a flowchart that illustrates a flow of the operation of the switch controller 212 in the in-vehicle electric system 2.

Figure 7:
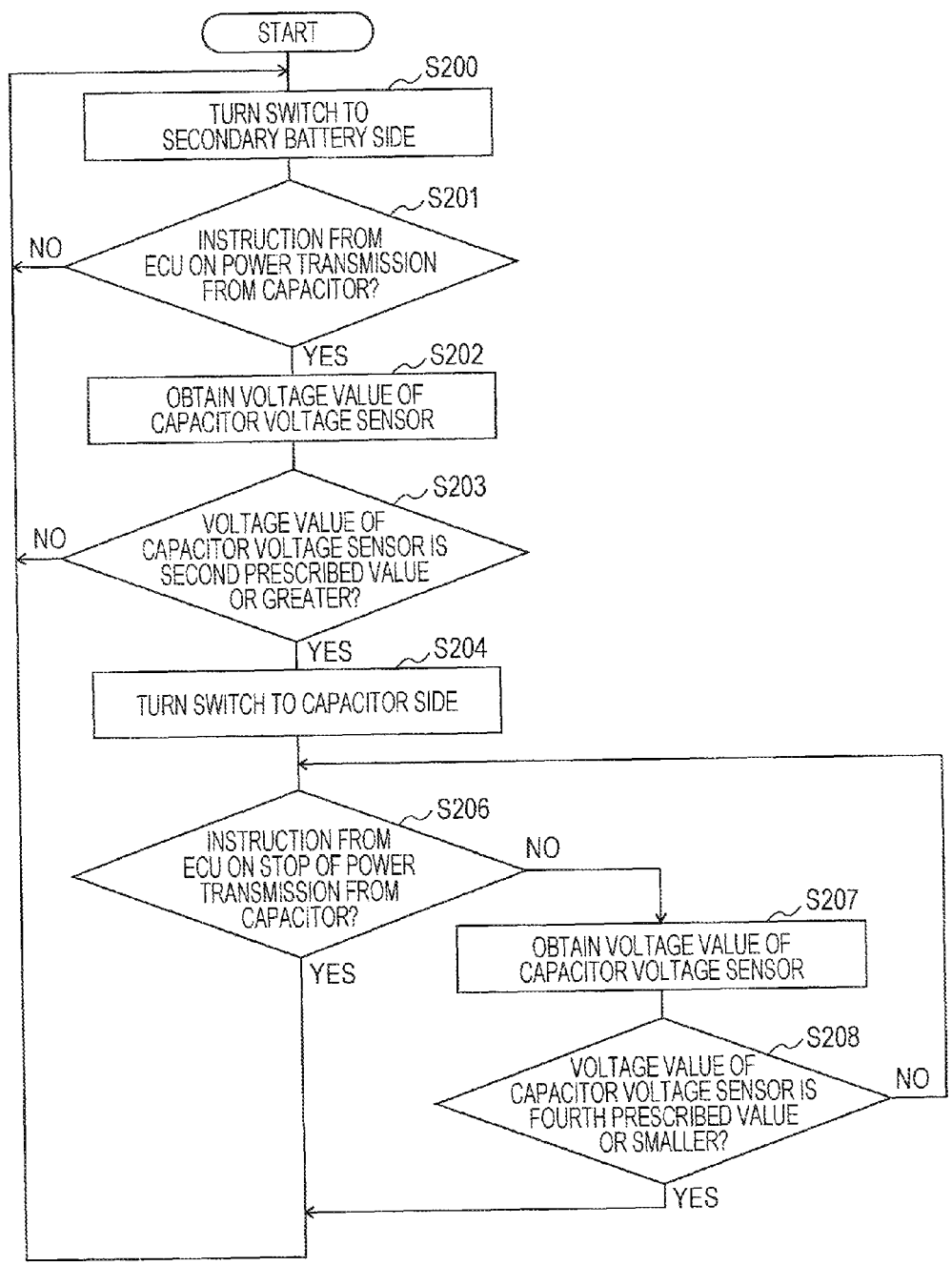
FIG. 7 is a flowchart that illustrates a flow of an operation of the in-vehicle electric system.

As illustrated in FIG. 7, the switch controller 212 first turns the switch 211 to the secondary battery 111 side (S200). The power is thereby supplied from the secondary battery 111 via the BMU 121 and the switch 211 to the first load 112a. That is, the secondary battery 111 serves as a power supply source to the first load 112a.

The switch controller 212 next determines whether or not an instruction on the power transmission from the in-vehicle solar system 400 to the first load 112a is provided from the ECU 122 (S201). In a case where the instruction on the power transmission is not provided, the operation returns to step S200, and the above operations are repeated.

On the other hand, when the instruction on the power transmission is provided, the switch controller 212 performs steps S202 and S203 that are similar to steps S102 and S103 illustrated in FIG. 4. In a case where the voltage value of the capacitor voltage sensor 106 is smaller than the above-described second prescribed value, a determination is made that the voltage value is not sufficient for the power transmission, the operation returns to step S200, and the above operations are repeated.

However, in a case where the voltage value of the capacitor voltage sensor 106 is the second prescribed value or greater, the switch controller 212 determines that the voltage value is sufficient for the power transmission and turns the switch 211 to the capacitor 102 side (S204). The power is thereby supplied from the capacitor 102 via the terminal 103 and the switch 211 to the first load 112a. That is, the capacitor 102 serves as the power supply source to the first load 112a.

The switch controller 212 next determines whether or not an instruction on a stop of the power transmission is provided from the ECU 122 (S206). In a case where the instruction on a stop of the power transmission is provided, the operation returns to step S200, and the above operations are repeated. The secondary battery 111 thereby again serves as the power supply source to the first load 112a while replacing the in-vehicle solar system 400.

On the other hand, in a case where the instruction on a stop of the power transmission is not provided from the ECU 122, the switch controller 212 performs steps S207 and S208 that are similar to the steps S107 and S108 illustrated in FIG. 4. In a case where the voltage value of the capacitor voltage sensor 106 is greater than the above-described fourth prescribed value, a determination is made that sufficient power remains in the capacitor 102, the operation returns to step S206, and the above operations are repeated. That is, the in-vehicle solar system 400 keeps serving as the power supply source to the first load 112a.

However, in a case where the voltage value of the capacitor voltage sensor 106 is the fourth prescribed value or smaller, a determination is made that sufficient power does not remain in the capacitor 102, the operation returns to step S200, and the above operations are repeated. The secondary battery 111 thereby again serves as the power supply source to the first load 112a while replacing the in-vehicle solar system 400.

(Operation Example)

An operation example of the in-vehicle solar system 400 illustrated in FIGS. 6 and 7 will be described below. The operation performed until the charge of the power generated by the solar battery module 101 to the capacitor 102 via the MPPT module 104 is similar to the in-vehicle solar system 300 illustrated in FIG. 3.

Here, an example is used where the rated voltage of the solar battery module 101 is 5 V, the rated power generation amount is 50 W, the rated voltage of the capacitor 102 is 15 V, and the capacitance is 40 F.

The time from the empty charged state of the capacitor 102 to the fully charged state is 180 seconds in a case where the solar battery module 101 provides the rated output. Further, the time is 90 seconds in a case where the output voltage of the MPPT module 104 is changed in response to the voltage of the capacitor 102. When the capacitor 102 is fully charged, the MPPT module 104 suspends the operation.

The power accumulated in the capacitor 102 is supplied to drive the first load 112a that is the starter, as necessary. The starter is driven preferably in a case where the engine is started to cancel the start-stop state in the automobile that includes the start-stop function.

In a case where the power accumulated in the capacitor 102 is used, the switch 211 is turned so that the first load 112a is connected with the in-vehicle solar system 400. In this case, the second load 112b that is the various kinds of auxiliary equipment and electric components and the secondary battery 111 are disconnected from the first load 112a.

The power output from the capacitor 102 is supplied to the first load 112a that is the starter via the terminal 103. The maximum power amount accumulated in the capacitor 102 is 4.5 kWs in a case where the voltage is 15 V and the capacitance is 40 F. Assuming that the first load 112a is driven until the voltage of the capacitor 102 becomes 10 V, the power supplied to the first load 112a becomes 2.5 kWs. In this embodiment, although the voltage to drive the starter fluctuates, the power amount is sufficient for starting the engine.

When the driving of the first load 112a that is the starter is finished, the switch 211 is turned to disconnect the in-vehicle solar system 400 from the first load 112a, and the charge from the solar battery module 101 to the capacitor 102 is resumed.

In the configuration, it is not necessary to provide the converter between the capacitor 102 and the terminal 103.

(Circuit Example of Solar Battery Module)

Various kinds of circuits and arrangement are possible for solar battery cells in the solar battery module 101 of the above embodiments.

Figure 8:
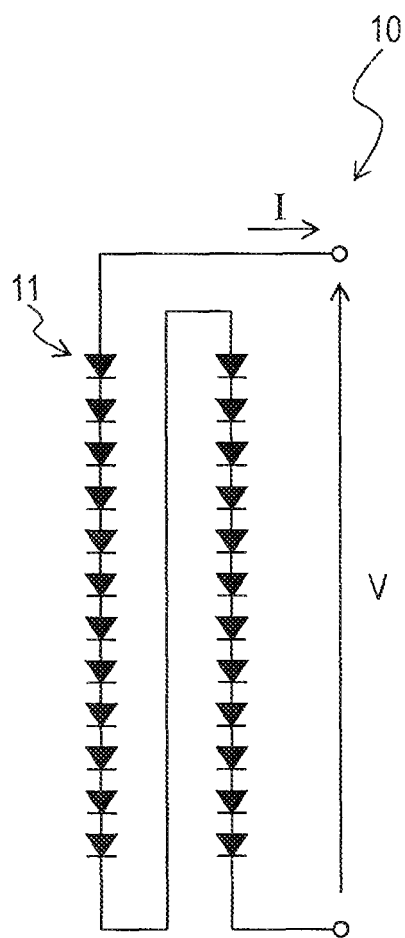
FIG. 8 is a circuit diagram that illustrates an example of a solar battery module in the in-vehicle electric system.

FIG. 8 is a circuit diagram of a solar battery module 10 that is an example of the solar battery module 101. A diode symbol in the diagram represents a single solar battery cell 11. The illustrated solar battery module 10 has a configuration in which plural (24 in the illustrated example) solar battery cells 11 are serially connected. In a case where the solar battery cell 11 is a silicon solar battery, the output voltage is approximately 12 V. Changing the number of solar battery cells 11 may change the output voltage.

In the example of the solar battery module 10 illustrated in FIG. 8, in a case where no sunlight is incident on the single solar battery cell 11, the output of the solar battery module 10 becomes zero even if sunlight is incident on all the other solar battery cells 11. Also in a case where the intensity of sunlight that incident on the single solar battery cell 11 becomes low, the output of the solar battery module 10 becomes significantly low because the current that may flow through the concerned solar battery cell 11 is limited. Such a situation may occur due to partial shade, adhesion of dirt or foreign objects on surfaces of the solar battery cells 11, or the like.

Figure 9:
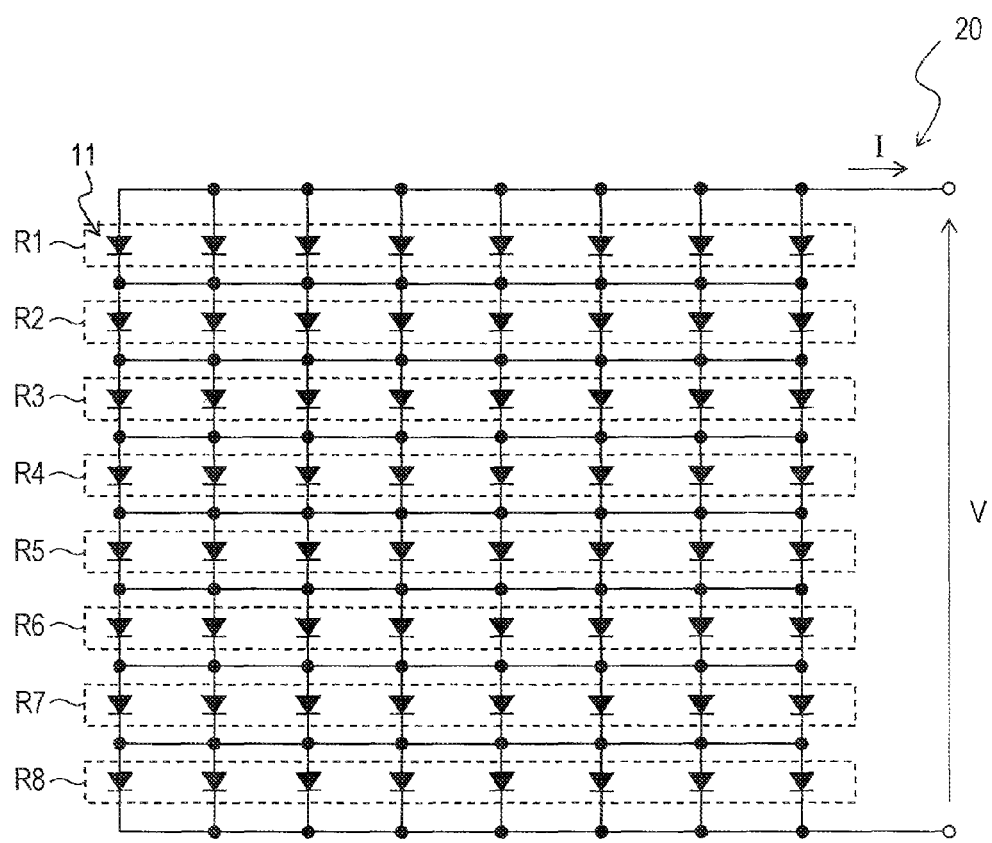
FIG. 9 is a circuit diagram that illustrates another example of the solar battery module.

FIG. 9 illustrates an example of the solar battery module that avoids such problems. FIG. 9 is a circuit diagram of a solar battery module 20 that is another example of the solar battery module 101. The illustrated solar battery module 20 includes plural (eight in the illustrated example) parallel connection units in which the plural (eight in the illustrated example) solar battery cells 11 are connected in parallel and is in a configuration of a serial-parallel connection unit in which plural parallel connection units R1 to R8 are serially connected.

In the solar battery module 20 illustrated in FIG. 9, even in a case where no sunlight is incident on the single solar battery cell 11, the other seven solar battery cells 11 that belong to the same parallel connection unit allow the current to flow. Accordingly, the output reduces only to ⅞ of an ideal state. Thus, an output decrease of the solar battery module due to the partial shade or the like may be reduced.

The example in FIG. 9 illustrates the configuration in which the serial-parallel connection is performed with the solar battery cells 11 in 8×8 arrangement. However, the number of parallel connections and the number of the serial connections are not limited to this. Further, the configuration illustrated in FIG. 9 is connected in parallel or series in a plural number, and the solar battery module 101 in a further large scale may thereby be formed.

(Arrangement Example of Solar Battery Module)

FIG. 10 is a plan view that illustrates an example of arrangement of the solar battery cells 11 in the solar battery module 20 that has the configuration illustrated in FIG. 9. In FIG. 10, the solar battery cells 11 are square in shape and arranged in an 8×8 matrix. In FIG. 10, the eight solar battery cells 11 that configure the parallel connection unit R1 illustrated in FIG. 9 is represented by a numeral 1, the eight solar battery cells 11 that configure the parallel connection unit R2 is represented by a numeral 2, and so on. Further, in FIG. 10, rectangular shadows A, B, and C are indicated by broken lines as examples of the partial shade.

In a case where the shadow A is formed on the solar battery module 20 illustrated in FIG. 10, only one of the eight solar battery cells 11 is in the shadow in each of the parallel connection units R1 to R8. Accordingly, the output of the solar battery module 20 reduces only to ⅞ of the ideal state. Further, a case where the shadow B is formed on the solar battery module 20 illustrated in FIG. 10 is similar.

However, in a case where the shadow C is formed on the solar battery module 20 illustrated in FIG. 10, all the eight solar battery cells 11 that configure the parallel connection unit R1 are in the shadow. Thus, the output of the solar battery module 20 becomes zero. In the arrangement where all the solar battery cells that configure the parallel connection unit are aligned on the same straight line in each of the parallel connection units R1 to R8 as described above, the output of the solar battery module 20 significantly decreases due to an elongated shadow in the direction along the straight line.

FIG. 11 illustrates an example of the solar battery module that avoids such problems. FIG. 11 is a plan view that illustrates another example of arrangement of the solar battery cells 11 in the solar battery module 20 that has the configuration illustrated in FIG. 9. In the solar battery module 20 illustrated in FIG. 11, the solar battery cells 11 are arranged so that all the solar battery cells 11 that configure the parallel connection unit are not aligned on a straight line with respect to each of the parallel connection units R1 to R8, compared to the solar battery module 20 illustrated in FIG. 10. Further, in FIG. 11, rectangular shadows D, E, and F are indicated by broken lines as examples of the partial shade.

In a case where the shadow D is formed on the solar battery module 20 illustrated in FIG. 11, only one of the eight solar battery cells 11 is in the shadow in each of the parallel connection units R1 to R8. Accordingly, the output of the solar battery module 20 reduces only to ⅞ of the ideal state. Further, a case where the shadow F is formed on the solar battery module 20 illustrated in FIG. 11 is similar.

On the other hand, in a case where the shadow E is formed on the solar battery module 20 illustrated in FIG. 11, only two of the eight solar battery cells 11 are in the shadow in each of the four parallel connection units R1, R3, R5, and R7. Accordingly, the output of the solar battery module 20 reduces only to 6/8 of the ideal state.

As described above, in the arrangement example of the solar battery cells 11 illustrated in FIG. 11, a significant decrease in the output of the solar battery module 20 due to an elongated shadow in a particular direction may be avoided compared to the arrangement example of the solar battery cells 11 illustrated in FIG. 10.

That is, arrangement is performed so that all the solar battery cells 11 that configure the parallel connection unit are not arranged on a straight line, and the decrease in the output of the solar battery module 20 due to the partial shade or the like that extends in a particular direction may thereby be considerably reduced. Accordingly, the decrease in the output of the solar battery module 20 may further efficiently avoided in a case where dirt, an adhesion object, or the like is present on the surface of the solar battery cell 11.

The arrangement of the solar battery cells 11 illustrated in FIG. 11 is merely an example, and arbitrary arrangement may be selected where all the solar battery cells 11 that configure the parallel connection unit are not arranged on a straight line.

The present invention is not limited to the above-described embodiments. Various modifications are possible in the scope described in claims, and embodiments that are obtained by appropriately combining technical means that are disclosed in the different embodiments are included in the technical scope of the present invention. In addition, new technical features may be formed by combining technical means that are disclosed in the embodiments.

For example, in the above embodiments, the present invention is applied to the in-vehicle electric systems 1 and 2 that are installed in the automobile. However, the present invention may be applied to in-vehicle electric systems that are installed in motorcycles, bicycles, and trailers. Further, the present invention may be applied to arbitrary electric systems that charge the secondary battery with electric energy generated by the solar battery, such as cellular phones that include the solar battery and solar power generation facilities.

As described above, a power supply device according to the present invention is a power supply device that supplies electric energy from a solar battery to an electric device and is configured to include a capacitor that accumulates electric energy from the solar battery and outputs the accumulated electric energy to the electric device.

Here, examples of the electric device include a secondary battery, a load, and the like. In a case where the electric device is the secondary battery, the power supply device serves as a charging device that charges the secondary battery with electric energy from the solar battery.

In a case where the electric device is the secondary battery, in the above configuration, the capacitor that is capable of the charge and discharge with a large current accumulates electric energy (power) generated by the solar battery, supplies the accumulated electric energy to the secondary battery with a large current, and may thereby charge the secondary battery. That is, the charge to the secondary battery may intermittently be performed. Accordingly, the circuits related to the charge may intermittently be operated. Thus, the power consumption of the circuits related to the charge may be reduced compared to related art in which the circuits related to the charge is continuously operated. As a result, the power generated by the solar battery may efficiently be supplied to the secondary battery.

The secondary battery may be a low output secondary battery for operating in-vehicle auxiliary equipment and electric components, for example, or may be a high output secondary battery for operating an in-vehicle electric motor, for example.

Meanwhile, in a case where the electric device is the load, in the above configuration, the capacitor accumulates electric energy (power) generated by the solar battery and supplies the accumulated electric energy to the load. In general, the capacitor is different from the secondary battery and is capable of the charge and discharge with a large current in a short time. Accordingly, the capacitor in the present invention may apply a large current to the load in a short time by using the accumulated electric energy from the solar battery.

Accordingly, the frequency of application of a large current in a short time from the secondary battery to the load may be reduced. As a result, degradation of the secondary battery may be hindered. In general, the capacitor causes significantly low loss and degradation due to the charge and discharge compared to the secondary battery. Thus, the capacitor hardly degrades even if the frequency of application of a large current in a short time increases.

As described above, the power supply device according to the present invention may effectively supply the power generated by the solar battery to the electric devices such as the secondary battery and the load.

The power supply device according to the present invention preferably further includes a maximum power point tracking module with respect to the solar battery, in which electric energy from the solar battery is preferably supplied to the capacitor via the maximum power point tracking module.

Here, the maximum power point tracking module (hereinafter abbreviated as MPPT module) is a control device that may automatically tracks the maximum power point that is a combination of the optimal current and voltage to maximize the output.

The MPPT module allows the power generated by the solar battery to be efficiently supplied to the capacitor, thus enabling further efficient supply of the power generated by the solar battery to the secondary battery.

The power supply device according to the present invention preferably further includes a converter that converts an output voltage from the capacitor into a prescribed voltage, in which electric energy from the capacitor is preferably output to the electric device via the converter.

In a case where the electric device is the secondary battery and the electric energy from the capacitor keeps being output to the secondary battery, the voltage of the capacitor lowers. Even in this case, the converter applies a prescribed voltage to the secondary battery, and the electric energy from the capacitor may thus keep being output to the secondary battery.

Meanwhile, in a case where the electric device is the load and the electric energy from the capacitor keeps being output to the load, for example, the output voltage of the capacitor lowers, in general. Further, the application of a large current in a short time results in a lowered output voltage of the secondary battery even if the capacity is sufficient for long time application of a current. In this case, the load may stop operating due to the lowered output voltage. However, in the above configuration, the converter applies the prescribed voltage to the load. As a result, a stop of the operation of the load due to the lowered output voltage may be avoided.

Thus, the capacitor may increase a power amount (electric energy) per output to the electric device. This results in a small capacity compared to a case where the converter is not provided.

An electric system that includes the power supply device in the above configuration and the solar battery that supplies electric energy to the power supply device may provide similar effects to the above description.

In the solar system according to the present invention, the solar battery is preferably a solar battery module that includes at least one serial-parallel connection unit in which plural parallel connection units in which the plural solar battery cells are connected in parallel are serially connected.

In this case, even if a portion of the solar battery cells stops the output due to shade, dirt or an adhesion object on the surface, and the like in the plural solar battery cells that configure the parallel connection unit, the remaining solar battery cells that are connected in parallel provide the output, and a circumstance where the output from the configuration becomes zero may thus be avoided. Accordingly, the serial-parallel connection unit in which the plural parallel connection units are serially connected may increase the output. In addition, the circumstance where the output becomes zero may be avoided even if a portion of the solar battery cells stops the output due to shade, dirt or an adhesion object on the surface, and the like.

In the solar system according to the present invention, the solar battery cells are preferably arranged in a matrix, and the plural solar battery cells are preferably arranged so that all the solar battery cells that configure the parallel connection unit are not aligned on a same straight line with respect to each of the parallel connection units.

In this case, even if shade that extends in a particular direction is projected on the solar battery module, a circumstance where all the solar battery cells are covered by the shade may be avoided because the plural solar battery cells are arranged so that all the solar battery cells that configure the parallel connection unit are not aligned on a same straight line. Accordingly, a circumstance where the output from the parallel connection unit becomes zero may be avoided. Thus, the serial-parallel connection unit in which the plural parallel connection units are serially connected may increase the output. In addition, the circumstance where the output becomes zero may be avoided even if a portion of the solar battery cells stops the output due to shade that extends in a particular direction.

An electric system that includes the solar system in the above configuration and the electric device to which the electric energy from the solar system is charged may provide similar effects to the above description.

The electric system according to the present invention may further include a power supply line that supplies electric energy from the solar system to the electric device, in which a secondary battery and a load as the electric devices may be connected with the power supply line. In this case, the electric energy from the solar system may be supplied to the secondary battery and may also be directly supplied to the load such as various kinds of in-vehicle auxiliary equipment and electric components, for example. The electric energy that operates the load is not charged to the secondary battery, thus causing no charge-discharge loss by the secondary battery. Accordingly, the power generated by the solar battery may efficiently be supplied to the load.

The electric system according to the present invention may include: the electric device that is a load; a secondary battery; and a switching means that switches between supply of electric energy from the power supply device to the load and supply of electric energy from the secondary battery to the load. In this case, the electric energy may be supplied from the secondary battery to the load in a case where the electric energy that is accumulated in the capacitor is low. Accordingly, although the frequency of application of a large current in a short time from the secondary battery to the load increases to some extent, the electric energy may stably be supplied to the load.

A vehicle that includes the electric system in the above configuration may provide similar effects to the above description. The vehicle may include an automobile, a motorcycle, a bicycle, a trailer, and the like.

Incidentally, it is necessary to apply a large current to the starter although for a short time. Accordingly, a vehicle according to the present invention preferably further includes an internal combustion engine that is a motive power source of the vehicle, and a starter that drives the internal combustion engine, in which the electric device preferably includes the starter as the load.

The vehicle according to the present invention may further include a start-stop means that stops the internal combustion engine when the vehicle stands still. In this case, the frequency of use of the starter significantly increases, and the application of the present invention is thus particularly effective.

INDUSTRIAL APPLICABILITY

As described above, the power supply device according to the present invention may effectively supply the power generated by the solar battery to the electric devices such as the secondary battery and the loads. Accordingly, the present invention may be applied to an arbitrary power supply device that supplies electric energy generated by the solar battery to the electric devices.

REFERENCE SIGNS LIST 1, 2 in-vehicle electric system
10, 20 solar battery module
11 solar battery cell
100, 200, 300, 400 in-vehicle solar system
101 solar battery module
102 capacitor
103, 203 terminal
104 MPPT module
105, 205 converter
106, 107 voltage sensor
111 secondary battery
112 load
113 high-voltage secondary battery
114 converter
121 BMU
122 ECU
211 switch (switching means)
212 switch controller

The invention claimed is:

1. An electric system comprising: a solar battery, an electric device, and a power supply device that supplies electric energy from the solar battery to the electric device,
wherein the power supply device further includes a capacitor that accumulates electric energy from the solar battery and outputs the accumulated electric energy to the electric device,
the electric device includes a load,
the power supply device further includes a first converter that converts an output voltage from the capacitor into a prescribed voltage,
electric energy from the capacitor is output to the electric device via the first converter,
the electric device includes a first secondary battery, a second secondary battery, and a second converter,
the load is connected with the second secondary battery via the first secondary battery and the second converter, and the second secondary battery supplies power to the first secondary battery via the second converter.

2. The electric system according to claim 1,
wherein the solar battery is a solar battery module that includes at least one serial-parallel connection unit in which plural parallel connection units in which plural solar battery cells are connected in parallel are serially connected.

3. The electric system according to claim 2,
wherein the solar battery cells are arranged in a matrix, and
the plural solar battery cells are arranged so that all the solar battery cells that configure the parallel connection unit are not aligned on a same straight line with respect to each of the parallel connection units.

4. A vehicle comprising:
the electric system according to claim 1;
an internal combustion engine that is a motive power source of the vehicle; and
a starter that drives the internal combustion engine,
wherein the electric device includes the starter as the load.

5. The vehicle according to claim 4, further comprising a start-stop means that stops the internal combustion engine when the vehicle stands still.

* * * * *